J. A. RAYMOND.
COLLAPSIBLE CASKET CARRIER.
APPLICATION FILED SEPT. 29, 1919.
1,347,466.
Patented July 20, 1920.
4 SHEETS—SHEET 1.
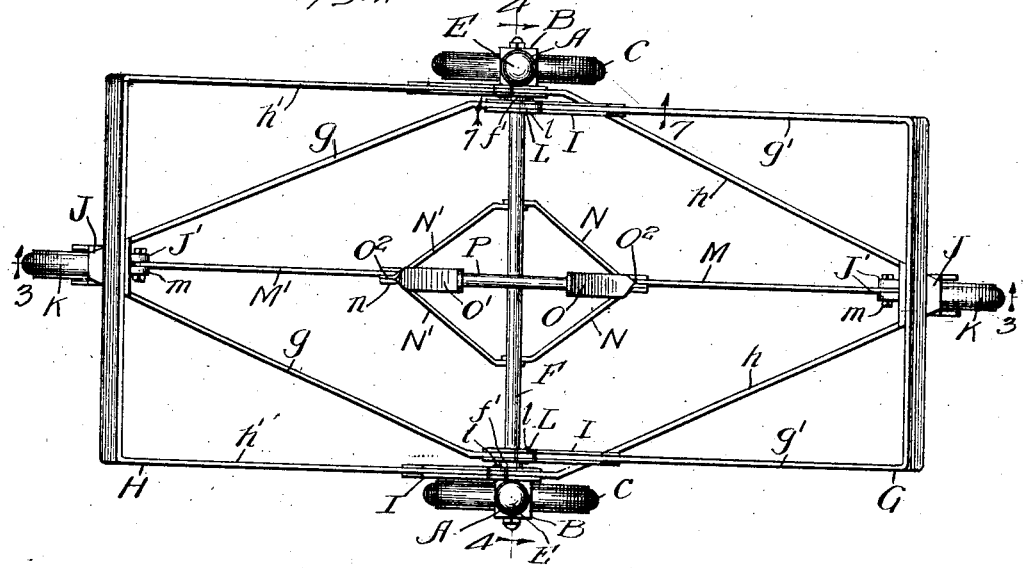
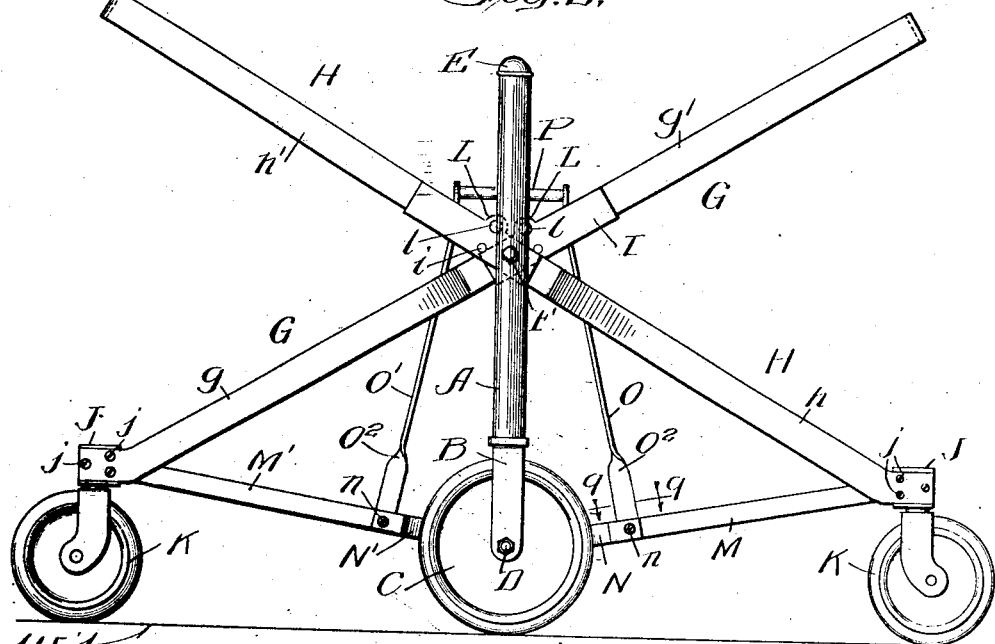
Witnesses:
W. F. Kilroy
Harry R. L. White
Inventor:
Joseph A. Raymond
by Charles Turner Brown,
Atty.

J. A. RAYMOND.
COLLAPSIBLE CASKET CARRIER.
APPLICATION FILED SEPT. 29, 1919.
1,347,466.
Patented July 20, 1920.
4 SHEETS—SHEET 2.
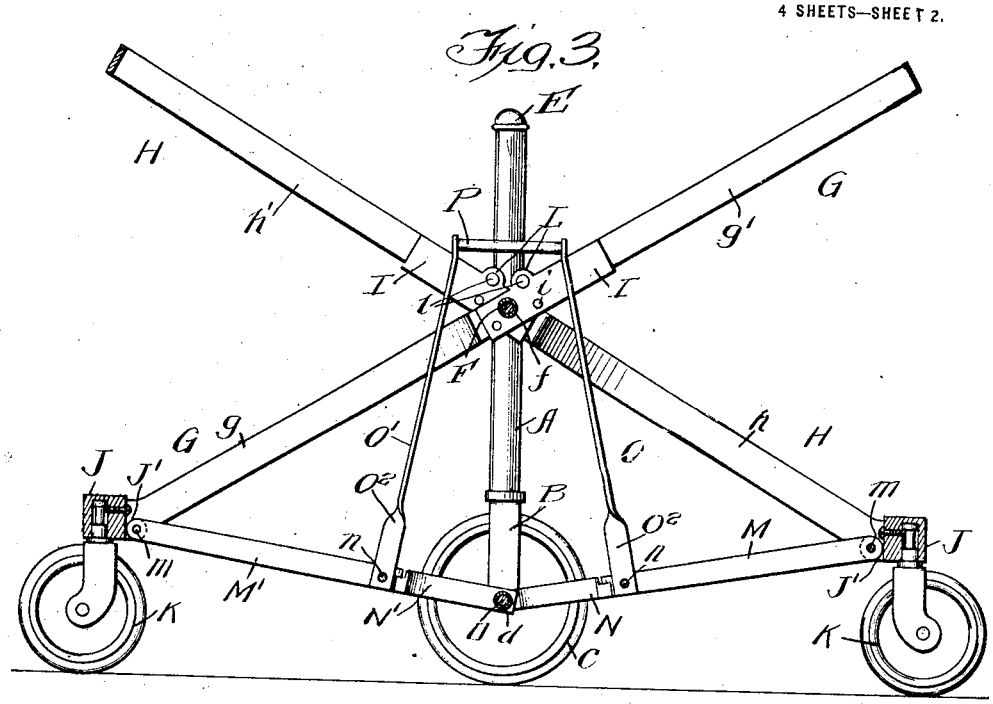
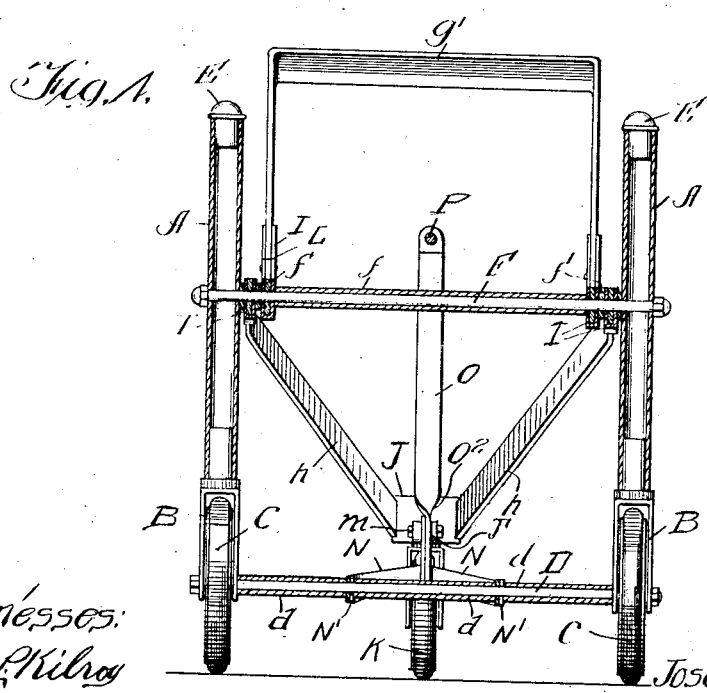
Witnesses:
Inventor:
Joseph A. Raymond
By Charles Turner Brown J. A. RAYMOND.
COLLAPSIBLE CASKET CARRIER.
APPLICATION FILED SEPT. 29, 1919.
1,347,466.
Patented July 20, 1920.
4 SHEETS—SHEET 3.
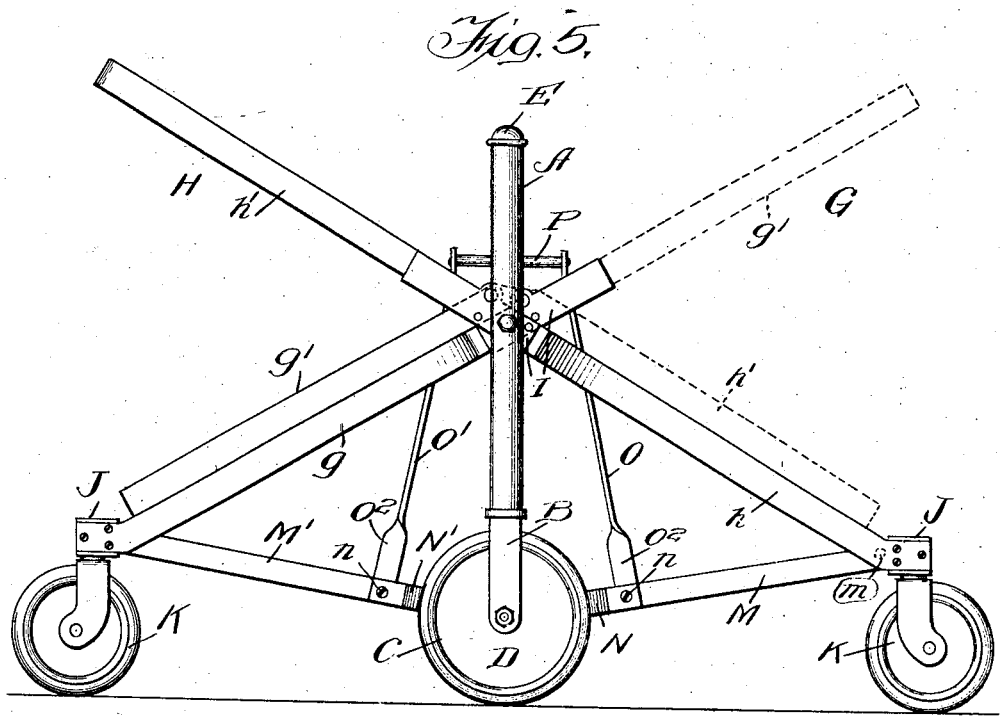
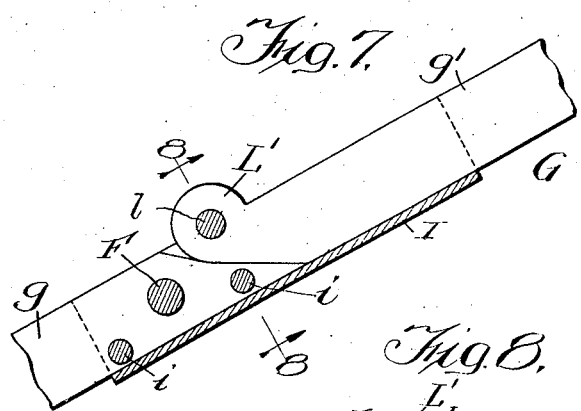
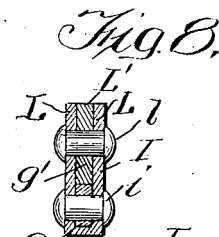
Witnesses:
W. F. Kilroy
Mary R. White
Inventor:
Joseph A. Raymond
By Charles Turner Brown,
Atty.

J. A. RAYMOND.
COLLAPSIBLE CASKET CARRIER.
APPLICATION FILED SEPT. 29, 1919.

1,347,466.

Patented July 20, 1920.
4 SHEETS—SHEET 4.

Witnesses:
W. F. Kilroy
Harry R. L. White

Inventor:
Joseph A. Raymond
By Charles Turner Brown,
Atty.

UNITED STATES PATENT OFFICE.

JOSEPH A. RAYMOND, OF CHICAGO, ILLINOIS.

COLLAPSIBLE CASKET-CARRIER.

1,347,466.  Specification of Letters Patent.  Patented July 20, 1920.

Application filed September 29, 1919. Serial No. 327,122.

*To all whom it may concern:*

Be it known that I, JOSEPH A. RAYMOND, a citizen of the United States, and a resident of Chicago, in the county of Cook and State of Illinois, have invented certain new and useful Improvements in Collapsible Casket-Carriers, of which the following, when taken in connection with the drawings accompanying and forming a part hereof, is a specification.

This invention relates to carriers used for supporting and conveying caskets, usually containing the body of a deceased person.

Among the objects of this invention is to obtain a collapsible casket carrier which, when in a collapsed condition can be easily carried by one person for a considerable distance, as say, from the street to a room in a dwelling, or to a hall, or chapel. Additional objects are to obtain a collapsible casket carrier which is strong and rigid when extended, and well adapted to hold considerable weight, in a manner to obviate the possibility of the carrier being broken or the casket and contents supported thereby being dismounted or falling therefrom. Additional objects are to obtain a collapsible casket carrier which is easily converted from a collapsed to an extended condition by the person carrying the same; a construction which is sightly in appearance, both in its extended and in its collapsed condition; not liable to be broken or to get out of repair; which is durable, and which is economically made. An additional object is to obtain a casket carrier on which a casket can be readily placed and removed, and which, when a casket is thereon, can be moved about without noise or apparent effort.

In the drawings referred to—

Figure 1 is a plan view, in an extended condition, of a carrier embodying this invention.

Fig. 2 is a side elevation of the carrier extended as in Fig. 1.

Fig. 3 is a section on line 3—3 of Fig. 1, viewed in the direction indicated by the arrows.

Fig. 4 is a section on line 4—4 of Fig. 1, viewed in the direction indicated by the arrows.

Fig. 5 is a side elevation similar to Fig. 1, with one of the casket supporting members partially collapsed, said member being indicated by broken lines in a supporting position.

Figure 6:
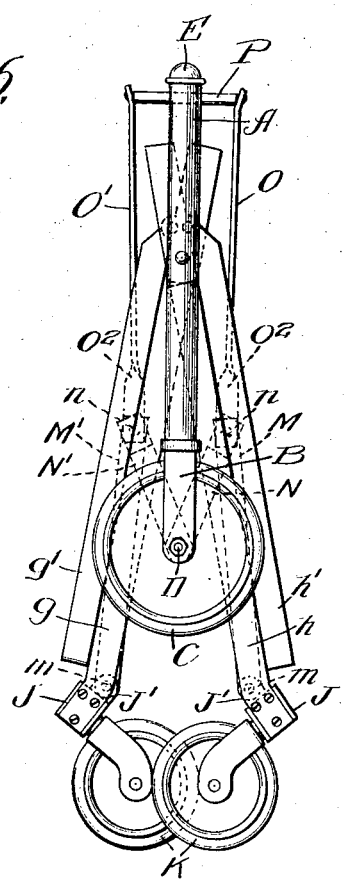
Fig. 6 is a side elevation of the carrier in a collapsed condition.

Figs. 7 and 8 are details of the joint of the supporting members of the carrier, on an enlarged scale, and 9, 10 and 11 details of the joints of the sub frame.

Reference characters applied to designate given parts indicate said parts throughout the several figures of the drawings, wherever the same appear.

A, A, represent vertical standards which are illustrated as made of tubing, and provided at the lower ends thereof with parallel members B, B, between which the wheels C, C, are rotatably mounted on axle or shaft D and at the upper ends thereof with the members E, E. $d$, represents a tube on shaft D. Members E, E, are preferably made of resilient rubber, to enable persons to set a casket thereon noiselessly, with the principal part of the weight of said casket supported thereby. F represents a shaft which is secured in standards A, A, and $f$ a tube on said shaft.

G, H, respectively represent two-part members which constitute the main or carrying frame of the carrier. Members G, H, are substantially duplicates. Member G consists of a plurality of bars, $g$, $g$, U-shaped members I, I, caster bases J, J, and casters K, K, and the bar $g^1$, which is illustrated as U-shaped. The lower ends of bars $g$, $g$, are rigidly secured to caster bases J, J, as by rivets or screws $j$, $j$. The U-shaped members I, I, are hereinafter termed cradles, or cradle members, and are rigidly secured to the upper ends of the bars $g$, $g$, as by rivets or bolts $i$, $i$, and project a distance beyond said upper ends. Cradles I, I, are provided with the ears L, L, and the bar $g^1$ is provided, at the ends thereof, with corresponding ears $L^1$, $L^1$. Bar $g^1$ is pivotally attached to the bars $g$, $g$, by pins or pivots $l$, $l$, extending through said ears. Members $g$, $g$, are supported at their upper ends by shaft F, which extends through apertures in said members and in the cradle members I, I, said shaft fitting loosely in said apertures. When the U-shaped bar $g^1$ is in the position in which it is illustrated in Figs. 1 and 2, the ends thereof which are adjacent to ears $L^1$, $L^1$, rest in cradle members I, I, with the ends thereof abutting against the ends of bars $g$, $g$.

The two-part member H is constructed of the same elements as is two-part member G, said parts being designated in the drawings as bars $h$, $h$, U-shaped bar $h^1$, and cradle members I, I. U-shaped bar $h^1$ is provided with ears $L^1$, $L^1$, and is pivotally attached to bars $h$, $h$, by pivots or pins $i$, $i$, which extend through said ears and corresponding ears (L, L), in the cradle members.

Member H is supported at the upper end thereof by shaft F which extends through the upper ends of bars $h$, $h$, and the cradle members I, I, thereon, in the same manner that member G is supported by said shaft, when the bars $h$, $h$, and $h^1$, are in the position in which they are illustrated in Figs. 1 and 2.

The carrier also comprises what I term a sub frame. This sub frame consists of members M, $M^1$, N, N, and $N^1$, $N^1$. One end of members M, $M^1$, is pivotally attached to body members or caster bases J, J, between ears $J^1$, on said caster bases, by means of pins or bolts $m$, $m$, and at their other ends they are pivotally joined to members N, N, and $N^1$, $N^1$, respectively, by pins or pivots $n$, $n$. Members N, N, and $N^1$, $N^1$, are pivotally mounted on axle or shaft D, and are held in spaced relation thereon by the tubing $d$, $d$, $d$, hereinbefore referred to.

The several above recited members M, $M^1$, N, N, and $N^1$, $N^1$, are subjected to tension when the carrier is extended and a weight placed thereon.

The sub frame also includes vertical bars O, $O^1$, which are pivoted at their lower ends on pivots $n$, $n$, and are attached at their upper ends to handle P.

These bars O, $O^1$, are represented as turned or twisted at $O^2$, so that the ends thereof are in vertical planes intersecting at an angle of ninety degrees.

Attention is directed to the fact that the U-shaped bars $g^1$ and $h^1$, are slightly different in length and in width, so that said bars, when turned on their respective pivots $l$, $l$, into a vertical plane, the bar $g^1$ is outside of the bar $h^1$. Said bars are also separated on the shaft F, by washers $f^1$, $f^1$, and the ends of bar $g^1$ are held in spaced relation by the tube $f$ on shaft F.

By the foregoing recited arrangement the bar $h^1$ may be passed or turned through the bar $g^1$, provided said bar $g^1$ is in a vertical plane; and after said bar $h^1$ has been passed or turned through said bar $g^1$, as described, the turning of said bars may be continued until edges or sides thereof rest on the upper edges or sides of bars $g$, $g$, $h$, $h$, (as illustrated in Fig. 5).

When said U-shaped bars $g^1$, $h^1$, are in the position last above described, upon grasping handle P and raising the carrier off the floor the several bars $g$, $g$, $h$, $h$, will turn on axle or shaft F into substantially the position illustrated in Fig. 6; bars N, $N^1$, will turn on axle or shaft D into nearly a vertical plane, and bars M, $M^1$, will turn on bolts or pivots $n$, $n$, into substantially the position illustrated in said figure. The carrier is then collapsed.

To set up the carrier it is simply necessary to lower the handle until the wheels and casters rest on the floor, thereby putting the sub frame under tension and into the position illustrated in Figs. 1 and 2 and thereafter turning the U-shaped bars $g^1$, $h^1$, on pivots $l$, $l$, into position illustrated in said Figs. 1 and 2. Said turning being the reverse hereinbefore operation of passing said bars by each other.

It will be observed that the length of the several bars $g$, $h$, M, $M^1$, and N, $N^1$, are so related that the collapsed condition of the carrier illustrated in Fig. 6 occurs.

When the carrier is in its extended position a casket (or other box of sufficient size) may be placed on the upper ends of posts A, A, and the upper edges of the cross members of the U-shaped bars $g^1$, $h^1$, as is indicated by broken lines X, Fig. 6. The casket or box placed as described and indicated is mainly supported by posts or standards A, A, and may be balanced thereon.

In any event no considerable part of the weight of the casket or its contents, is supported by said U-shaped bars $g$, $g^1$. The pivotal joints $l$, $l$, and the cradle members I, I, may be omitted, if it is not desired to obtain the completely collapsed condition which is illustrated and hereinbefore described, in which case the U-shaped members $g^1$ and $h^1$, extend to and are secured on the caster bases J, J, (members $g$, $g$, and $h$, $h$, being omitted).

However, when constructed as illustrated a weight of several hundred pounds is supportable by said bars $g$, $g^1$, and $h$, $h^1$; and by making said bars of comparatively heavy material the cradle members I, I, may be omitted, in which case the abutting ends of bars $g$, $g^1$, and $h$, $h^1$, together with pivots $l$, $l$, are sufficient to maintain said bars in their extended and supporting position, under considerable load.

Figure 9:
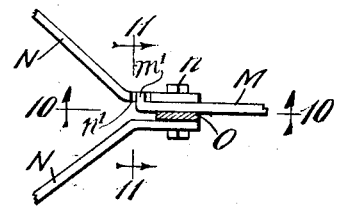
Figures 10, 11:
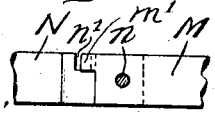

To prevent "sagging" of the sub frame, when the carrier is in its extended condition, a portion of the ends of bars M and $M^1$, is removed, and the projecting fingers $m^1$, which are obtained thereby are bent at right angle to the body portion of said bars, (see Figs. 9, 10 and 11), and the adjacent ends of one of the bars N, $N^1$, are provided with notches, $n^1$, to receive said bent ends. These bent ends and notches also make it certain that on lifting the carrier from the floor the several members will automatically collapse as recited.

I claim:—

1. In a collapsible casket carrier, standards, a shaft and an additional shaft joining said standards, and a frame consisting of caster bases, bars rigidly attached to said caster bases and pivotally attached to said shaft, and additional bars pivotally attached to said first named bars, in combination with a sub frame consisting of bars and a plurality of bars, a handle and vertical bars, said bars pivotally attached to said caster bases, to said plurality of bars and said vertical bars, and said plurality of bars pivotally attached to said additional shaft.

2. In a collapsible carrier, standards, a shaft and an additional shaft joining said standards, wheels rotatively mounted on said shaft, and a frame consisting of caster bases, casters in said bases, bars, one end of said bars rigidly attached to said caster bases and the other end of said bars pivotally supported on said additional shaft, and additional bars pivotally attached to said first named bars, in combination with a sub frame consisting of bars and a plurality of bars, a handle and vertical bars, said bars pivotally attached to said caster bases, to said plurality of bars and said vertical bars, and said plurality of bars pivotally supported on said first named shaft.

3. In a collapsible carrier, standards, wheels rotatably mounted at one end of said standards, a shaft and an additional shaft joining said standards, and a frame consisting of bases, wheels rotatably mounted on said bases and bars rigidly secured to said bases and pivotally mounted on said shaft, in combination with a sub frame consisting of bars and a plurality of additional bars, said bars of said sub frame pivotally attached at the ends thereof to said bases and to ends of said additional bars, and said additional bars pivotally mounted at ends thereof on said additional shaft.

4. In a collapsible carrier, standards, wheels rotatably mounted at one end of said standards, a shaft and an additional shaft joining said standards, and a frame consisting of bases, wheels rotatably mounted on said bases and bars rigidly secured to said bases and pivotally mounted on said shaft, in combination with a sub frame consisting of bars pivotally attached to said bases, additional bars pivotally attached to said last named bars and pivotally mounted on said additional shaft, said bars and additional bars provided at the meeting and pivoted ends thereof with fingers and co-acting notches.

5. In a collapsible carrier, standards, a shaft and an additional shaft joining said standards, wheels rotatably mounted on said shafts, and a frame consisting of caster bases, casters in said bases, bars, one end of said bars attached to said caster bases and the other end of said bars pivotally supported on said additional shaft, cradles attached to said pivotally supported end of said bars, and additional bars pivotally attached to said first named bars by pivots extending through said cradles and said additional bars, in combination with a sub frame consisting of bars and a plurality of bars, a handle and vertical bars, said bars pivotally attached to said caster bases, to said plurality of bars and to said vertical bars, and said plurality of bars pivotally supported on said first named shaft, and said handle and vertical bars connected.

JOSEPH A. RAYMOND.

Witnesses:
 CHARLES TURNER BROWN,
 B. S. BROWN.